US012343742B2

(12) United States Patent
Kuo

(10) Patent No.: US 12,343,742 B2
(45) Date of Patent: Jul. 1, 2025

(54) NOZZLE FOR USE WITH A HOSE

(71) Applicant: Ting-Yen Kuo, Fangyuan Township, Changhua County (TW)

(72) Inventor: Ting-Yen Kuo, Fangyuan Township, Changhua County (TW)

( * ) Notice: Subject to any disclaimer, the term of this patent is extended or adjusted under 35 U.S.C. 154(b) by 327 days.

(21) Appl. No.: 18/140,567

(22) Filed: Apr. 27, 2023

(65) Prior Publication Data

US 2024/0359195 A1 Oct. 31, 2024

(51) Int. Cl.
*B05B 1/26* (2006.01)
*B05B 1/30* (2006.01)
*B05B 12/00* (2018.01)

(52) U.S. Cl.
CPC ............ *B05B 1/265* (2013.01); *B05B 1/3026* (2013.01); *B05B 12/002* (2013.01)

(58) Field of Classification Search
CPC ..... B05B 1/265; B05B 1/3026; B05B 1/3046; B05B 12/002; E03C 1/025; E03C 1/0408; E03C 2001/026; E03C 2201/30
See application file for complete search history.

(56) References Cited

U.S. PATENT DOCUMENTS

2005/0178858 A1* 8/2005 Roman ................ B05B 1/1663 239/456
2008/0067264 A1* 3/2008 Erickson ............... B05B 1/1618 239/525

FOREIGN PATENT DOCUMENTS

CA 2538541 A1 * 4/2007 ............... B05B 1/18
EP 3398688 A1 * 11/2018 ........... B05B 1/1663

* cited by examiner

*Primary Examiner* — Qingzhang Zhou
(74) *Attorney, Agent, or Firm* — Wang Law Firm, Inc.

(57) ABSTRACT

A nozzle includes a shell, a splashing plate, a valve and a switch. The splashing plate is connected to the shell. The valve is movably inserted in the shell. The switch is connected to the shell and the valve both. The switch is operable to control the flow rate and splash patterns.

8 Claims, 9 Drawing Sheets

NOZZLE FOR USE WITH A HOSE

BACKGROUND OF INVENTION

1. Field of Invention

The present invention relates to control over water from a hose and, more particularly, to a nozzle for use with a hose.

2. Related Prior Art

In irrigation for example, a hose is connected to a water source such as a faucet at an end and connected to a nozzle at another end. Thus, the nozzle is operable to control water from the faucet through the hose.

A conventional nozzle includes a mechanism to control the flow rate and another mechanism to control splash patterns. Basically, the operation of the first mechanism is independent of the operation of the second mechanism. The first mechanism includes a number of elements. The second mechanism includes another amount of element. Hence, there are problems with this conventional nozzle.

Firstly, it is structurally complicated for including a large amount of elements. This large amount of elements inevitably increases the cost of the conventional nozzle regarding the production of the elements and regarding the assembly.

Secondly, it is bulky for including the large amount of elements. The large size renders it difficult to carry and store the conventional nozzle.

Thirdly, the operation of the conventional nozzle is complicated because a trigger is operated to control the flow rate and a switch is operated to select from the splash patterns. It requires skills from a user to handle this conventional nozzle.

Fourthly, the entire conventional nozzle has to be disassembled even though only the first or second mechanisms is out of order. The maintenance of this conventional nozzle is troublesome and hence expensive.

The present invention is therefore intended to obviate or at least alleviate the problems encountered in the prior art.

SUMMARY OF INVENTION

It is the primary objective of the present invention to provide an inexpensive, compact, easy-to-use and easy-to-maintain nozzle.

To achieve the foregoing objective, the nozzle includes a shell, a splashing plate, a valve and a switch. The splashing plate is connected to the shell. The valve is movably inserted in the shell. The switch is connected to the shell and the valve both. The switch is operable to control the flow rate and splash patterns.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
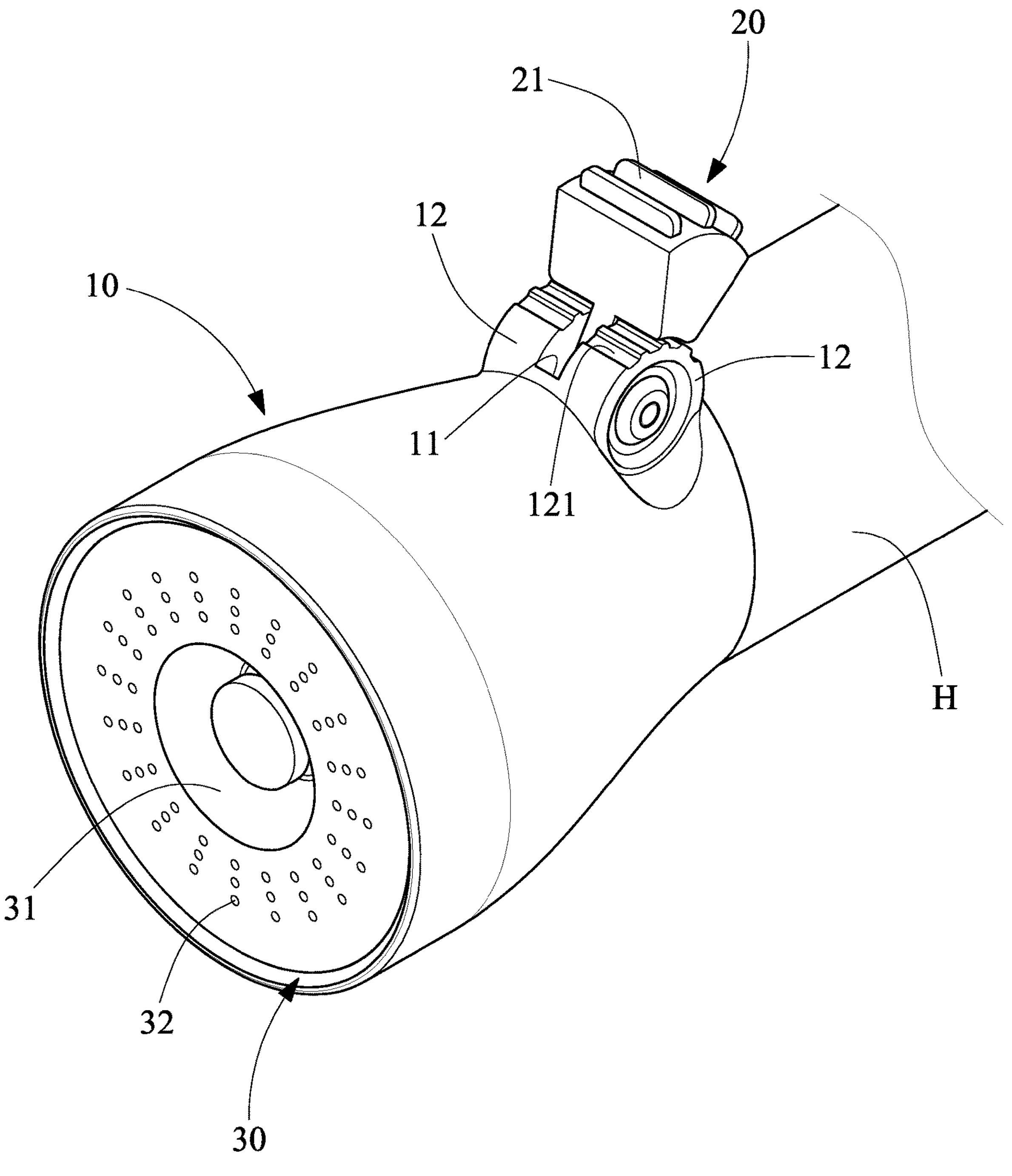
FIG. 1 is a perspective view of a nozzle according to the preferred embodiment of the present invention.
Figure 2:
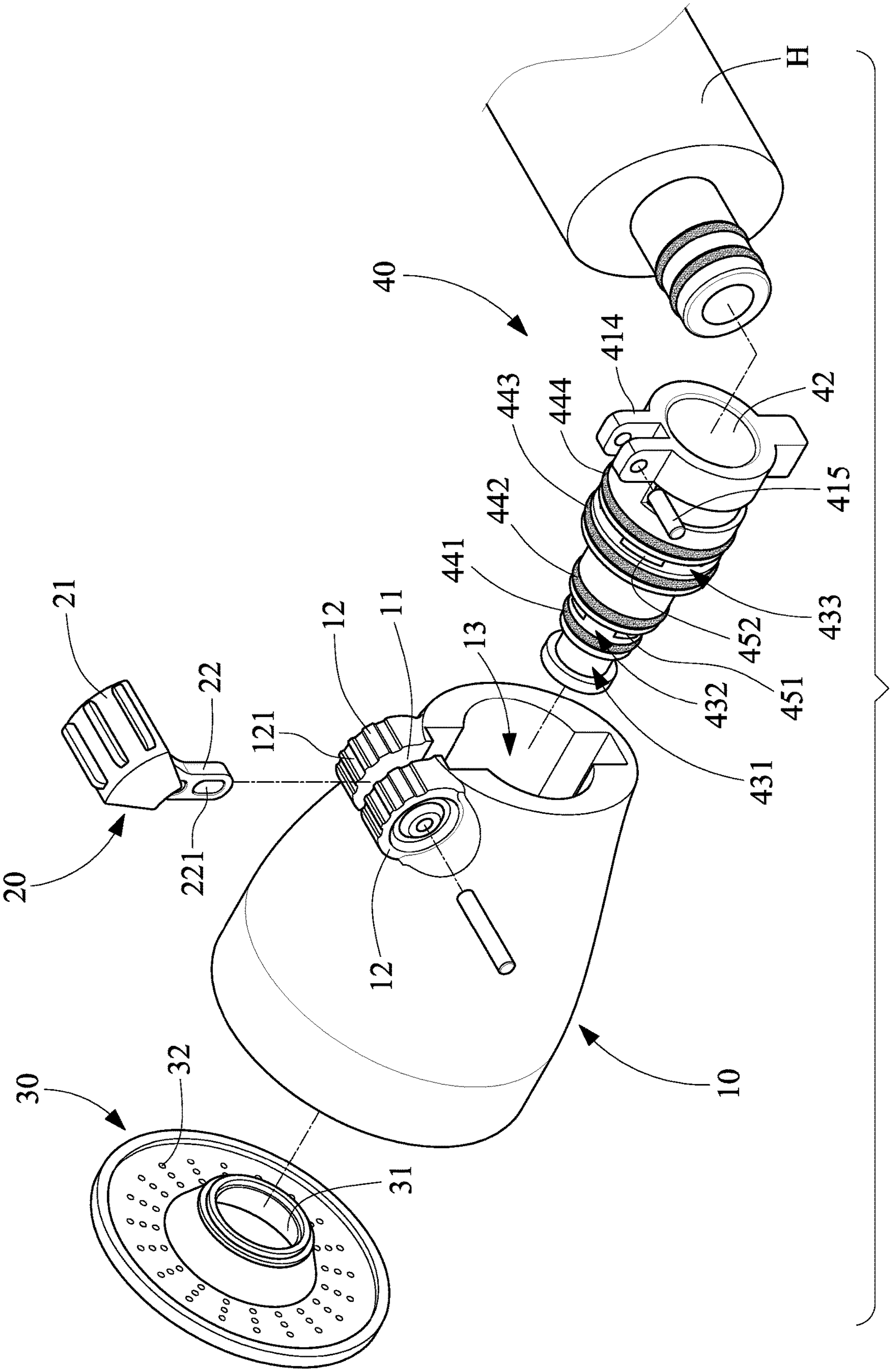
FIG. 2 is an exploded view of the nozzle shown in FIG. 1.
Figure 3:
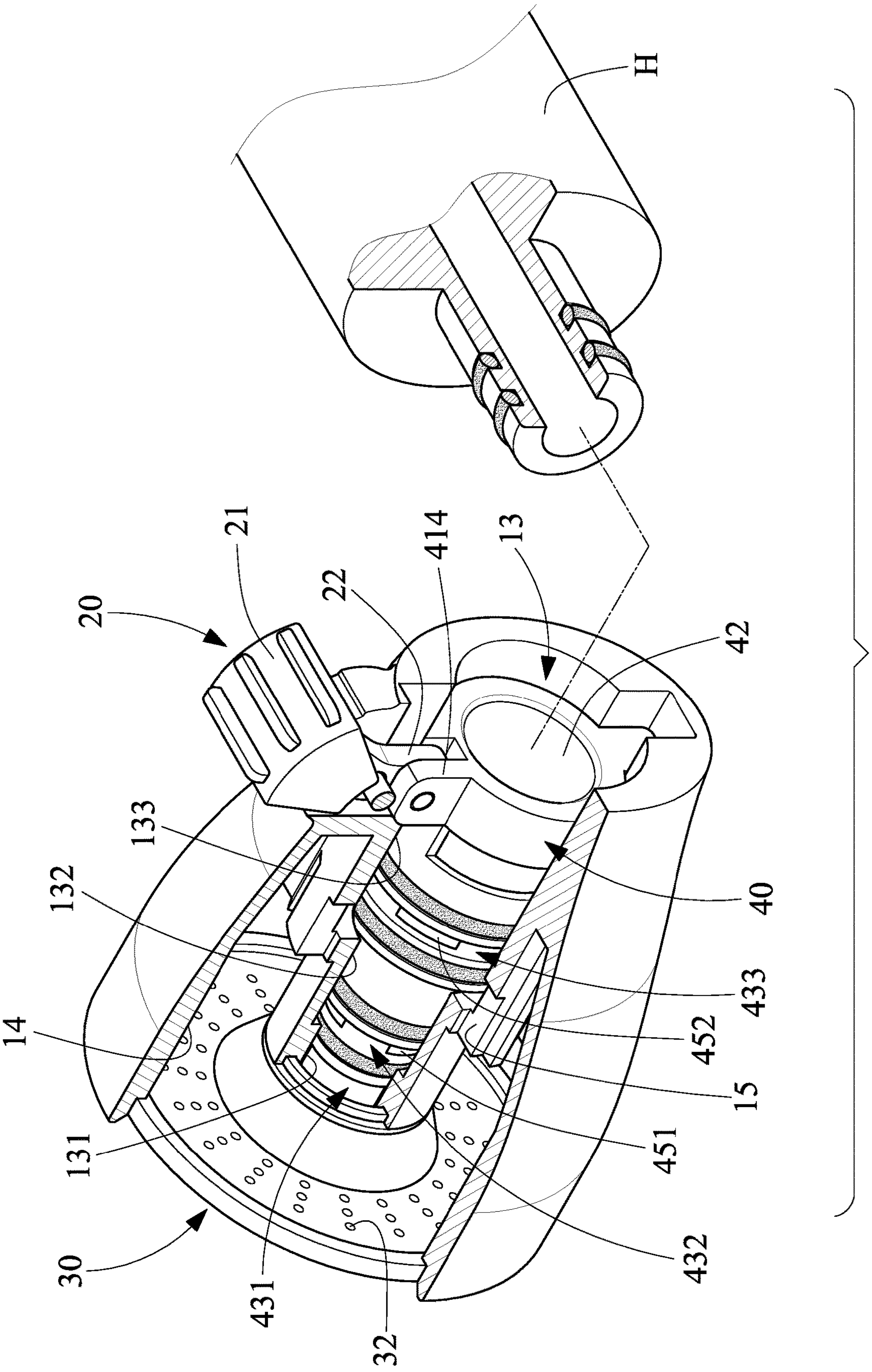
FIG. 3 is a cut-away view of the nozzle shown in FIG. 1.
Figure 4:
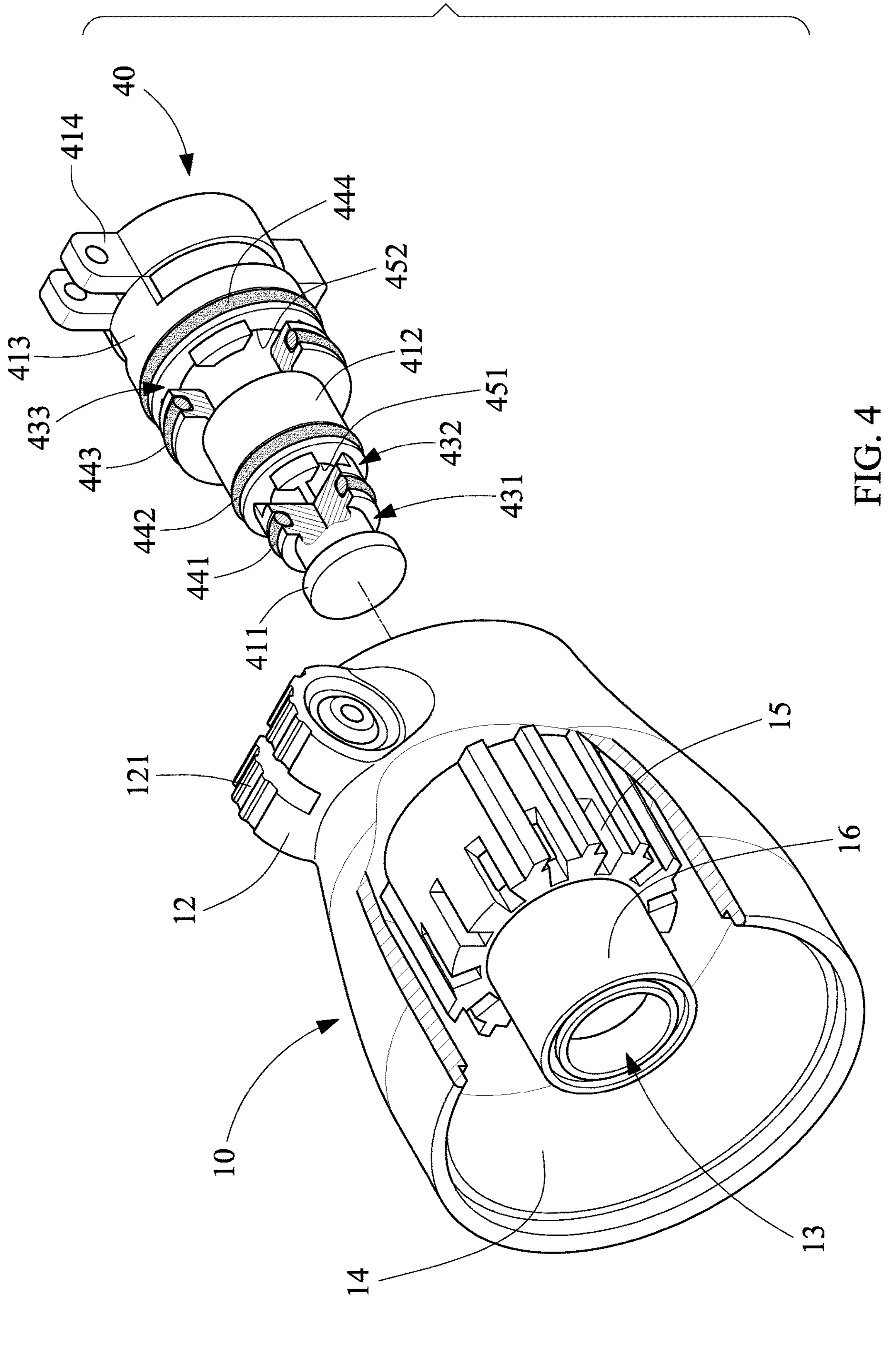
FIG. 4 is another cut-away view of the nozzle shown in FIG. 1.
Figure 5:
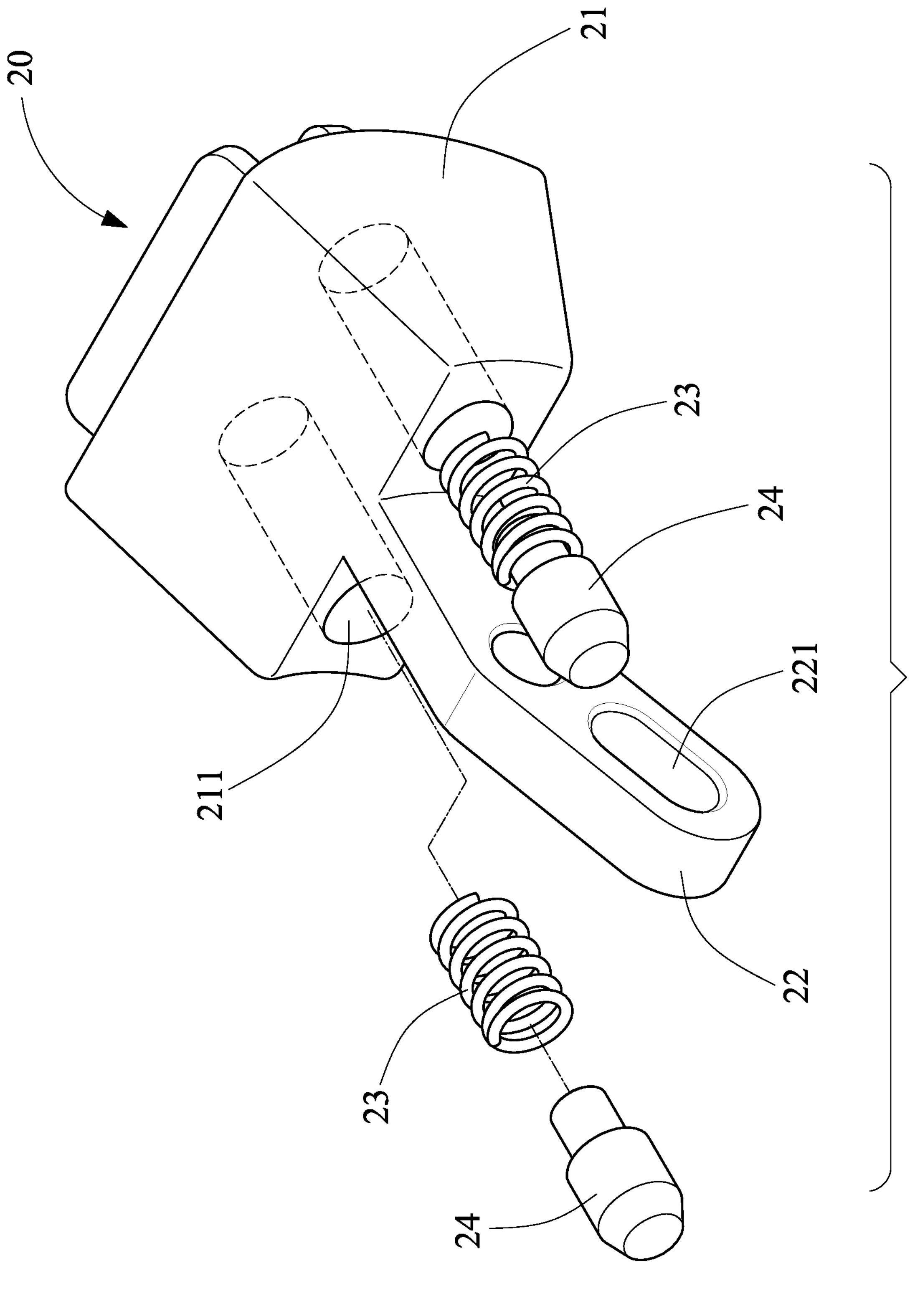
FIG. 5 is a perspective view of a switch of the nozzle shown in FIG. 2.

Referring to FIGS. 1 through 6, a nozzle includes a shell 10, a switch 20, an splashing plate 30 and a valve 40 according to the preferred embodiment of the present invention. The nozzle is operable to control water from a water source such as a faucet through a hose H.

In use, the shell 10 is connected to the hose H. The shell 10 includes a slit 11, two lugs 12, an axial pipe 16, an axial channel 13, an annular chamber 14 and lateral channels 15.

The slit 11 extends between the lugs 12, which are formed on the shell 10 near an end. The slit 11 extends in a radial direction of the shell 10. Each of the lugs 12 includes four recesses 121 for example.

The axial pipe 16 axially extends from an internal portion of the shell 10. The axial channel 13 extends throughout the axial pipe 16. The axial channel 13 is in communication with the slit 11. Preferably, the axial channel 13 is a stepped channel including three sections 131, 132 and 133.

The annular chamber 14 is made in the shell 10 near another end opposite to the end near which the lugs 12 are formed. The lateral channels 15 are made in the shell 10. Each of the lateral channels 15 includes an end in communication with the annular chamber 14 and another end in communication with the axial channel 13.

The switch 20 is operable to control the nozzle. The switch 20 includes a handle 21, a lever 22, two bores 211, two springs 23 and two detents 24.

A first side of the handle 21 is formed with ridges (not numbered) as an anti-skid device. The bores 211 are made in a second side of the handle 21.

The springs 23 are inserted in the bores 211 respectively. The detents 24 are inserted in the bores 211 respectively. Each of the detents 24 includes an end abutted against one of the springs 23 and another end inserted in a selected one of the recesses 121 of one of the lugs 12.

The lever 22 extends from the second side of the handle 21 between the bores 211. The lever 22 is located between and pivotally connected to the lugs 12. A free end of the lever 22 extends in the axial channel 13 via the slit 11. The lever 22 is formed with a slot 221.

The splashing plate 30 is connected to the shell 10 to cover the annular chamber 14. The splashing plate 30 includes a conical portion 36, a conical aperture 31 and splashing apertures 31.

The conical portion 36 extends from the splashing plate 30 axially. The conical portion 36 of the splashing plate 30 is abutted against the axial pipe 16 of the shell 10, thereby isolating the axial channel 13 from the annular chamber 14. However, it should be noted that the annular chamber 14 is in communication with the axial channel 13 through the lateral channels 15.

The conical aperture 31 axially extends throughout the conical portion 36 of splashing plate 30. The conical aperture 31 is in communication with the axial channel 13 of the shell 10.

The splashing apertures 32 extend throughout the splashing plate 30. The slashing apertures 32 are in communication with the annular chamber 14 of the shell 10. The splashing apertures 32 are distributed around the conical aperture 31.

The valve 40 is movably inserted in the axial channel 13 of the shell 10. The valve 40 is shaped in compliance with the axial channel 13. In diameter, the valve 40 includes a small section 411, a medium section 412 and a large section 413.

The valve 40 further includes an inlet 42, ears 414, three annular grooves 431, 432 and 433, four rings 441, 442, 443 and 444, a first group of outlets 451, and a second group of outlets 452.

The inlet 42 axially extends in the valve 40. In use, the inlet 42 receives an end of the hose H.

The ears 414 are formed on an external face of the valve 40 adjacent to the inlet 42. The lever 22 of the switch 20 is located between the ears 414. A pin 415 is inserted in apertures (not numbered) of the ears 414 and the slot 221 of the lever 22, thereby pivotally connecting the lever 22 to the ears 414.

The grooves 431, 432 and 433 are sequentially made in the external face of the valve 40. The annular groove 431 is located in the small section 411. The annular groove 432 is located in the medium section 412 adjacent to the small section 411. The annular groove 433 is located in the large section 413 adjacent to the ears 414.

The ring 441 is located on and around the small section 411 of the valve 40. Depending on the location of the valve 40 in the shell 10, the first ring 441 is in contact with the wall of the section 131 of the axial channel 13 or located in the section 132 of the axial channel 13.

The ring 442 is located on and around the medium section 412 of the valve 40. The annular groove 432 is located between the rings 441 and 442. The second ring 442 is always in contact with the wall of the section 132 of the axial channel 13.

The rings 443 and 444 are located on and around the large section 413 of the valve 40. The third annular groove 433 is located between the rings 443 and 444. The rings 443 and 444 are always in contact with the wall of the section 133 of the axial channel 13.

The first group of outlets 451 is made in the medium section 412 of the valve 40 in the annular groove 432. The annular groove 432 is in communication with the inlet 42 via the first group of outlets 451.

The second group of outlets 452 is made in the large section 413 of the valve 40 in the annular groove 433. The annular groove 433 is in communication with the inlet 42 via the second group of outlets 452.

In use, the switch 20 is operated to move the valve 40 along the axial channel 13 to close the nozzle or use the nozzle to sprinkle or provide a water jet or conical splash. That is, the flow rate and the splash patterns is easily under control.

Figure 6:
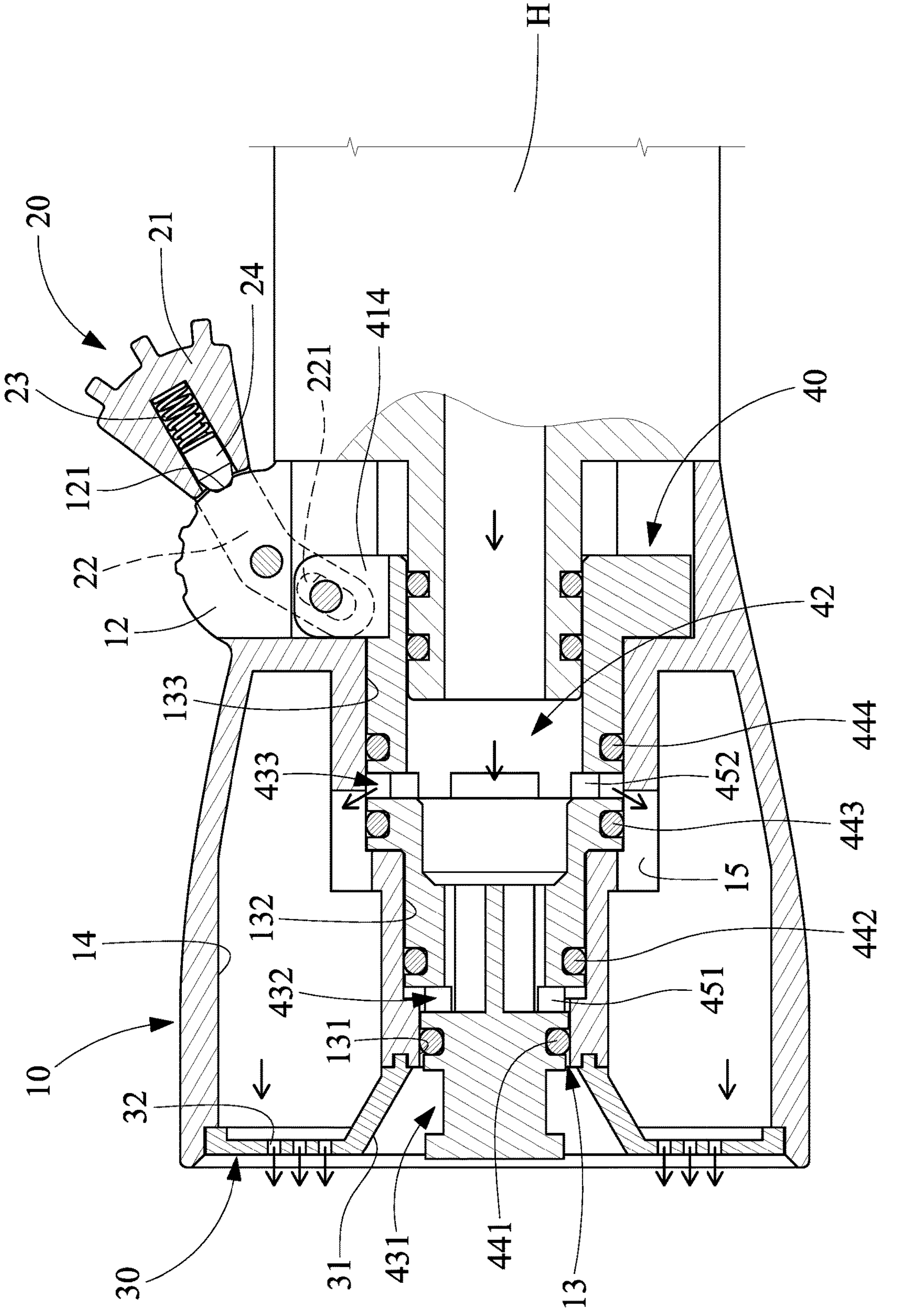
FIG. 6 is a cross-sectional view of the nozzle shown in FIG. 1.

Referring to FIG. 6, the nozzle is used to sprinkle. To this end, the switch 20 is pivoted backward all the way toward the hose H until each of the detents 24 is in a first one of the recesses 121 of one of the lugs 12. Thus, the lever 22 moves the valve 40 toward the splashing plate 30 along the axial channel 13 to bring the annular groove 433 of the valve 40 into communication with the lateral channels 15 of the shell 10. Hence, water goes from the hose H into the inlet 42, the second group of outlets 452, the annular groove 433 and the lateral channels 15. Finally, water is sprinkled from the splashing apertures 32 of the splashing plate 30.

Figure 7:
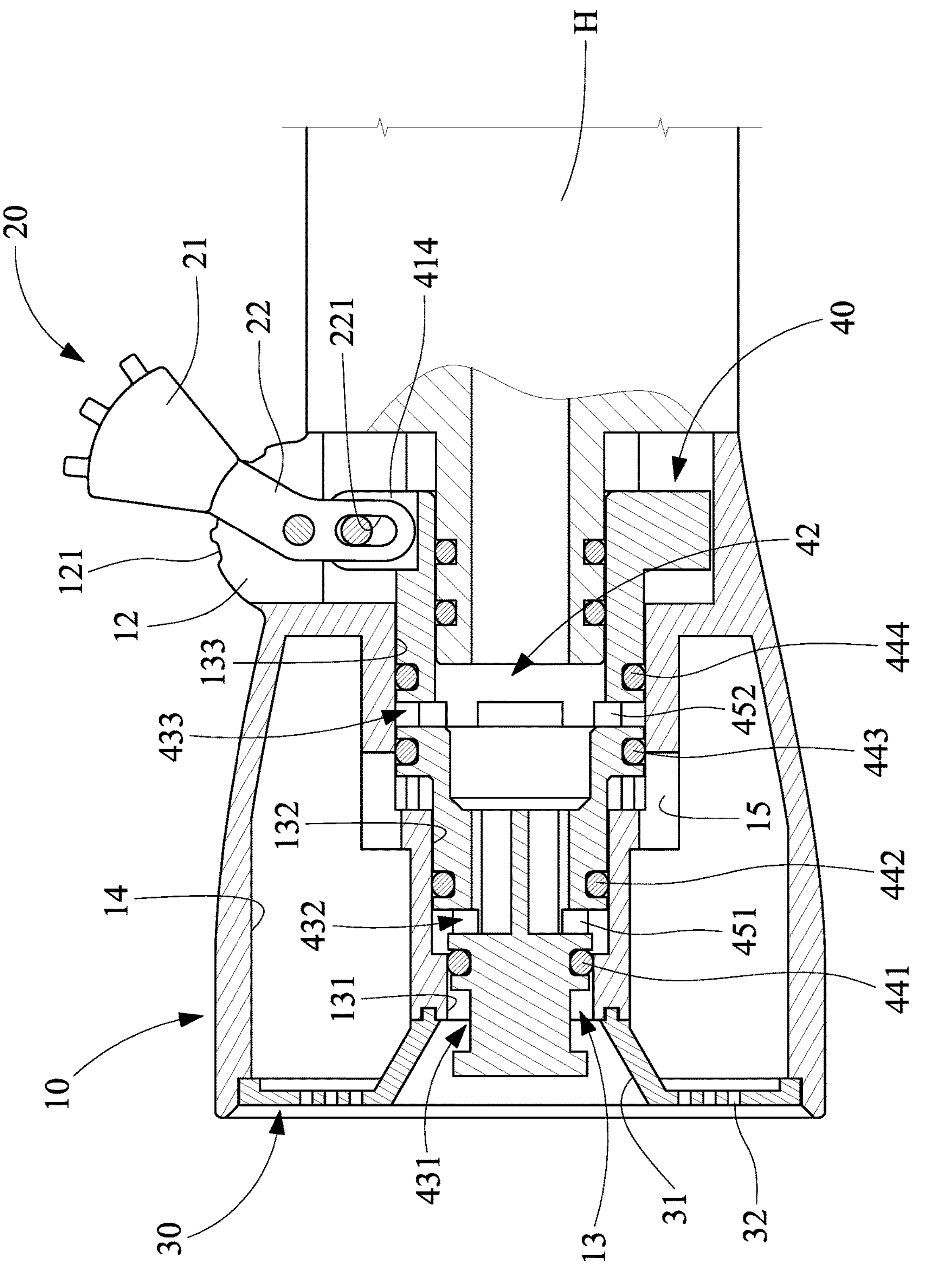
FIG. 7 is a cross-sectional view of the nozzle in another position than shown in FIG. 6.

Referring to FIG. 7, the nozzle is closed. To this end, the switch 20 is pivoted forward until each of the detents 24 is inserted in a second one of the recesses 121 of one of the lugs 12. Thus, the switch 20 moves the valve 40 backward toward the hose H along the axial channel 13 to bias the annular groove 433 of the valve 40 from the lateral channels 15. The annular groove 432 is isolated from the section 131 of the axial channel 13 because the rings 441 and 442, which are located on two opposite sides of the annular groove 432, are in contact with the wall of the axial channel 13. The annular groove 433 is isolated from the section 131 of the axial channel 13 because the rings 443 and 444, which are located on two opposite sides of the annular groove 433, are in contact with the wall of the axial channel 13.

Thus, water goes from the hose H into the inlet 42, the second group of outlets 452, the annular groove 433, and the first group of outlets 451 and the annular groove 432. The annular grooves 432 and 433 are isolated from the section 131 of the axial channel 13. Hence, the water is kept in the nozzle.

Figure 8:
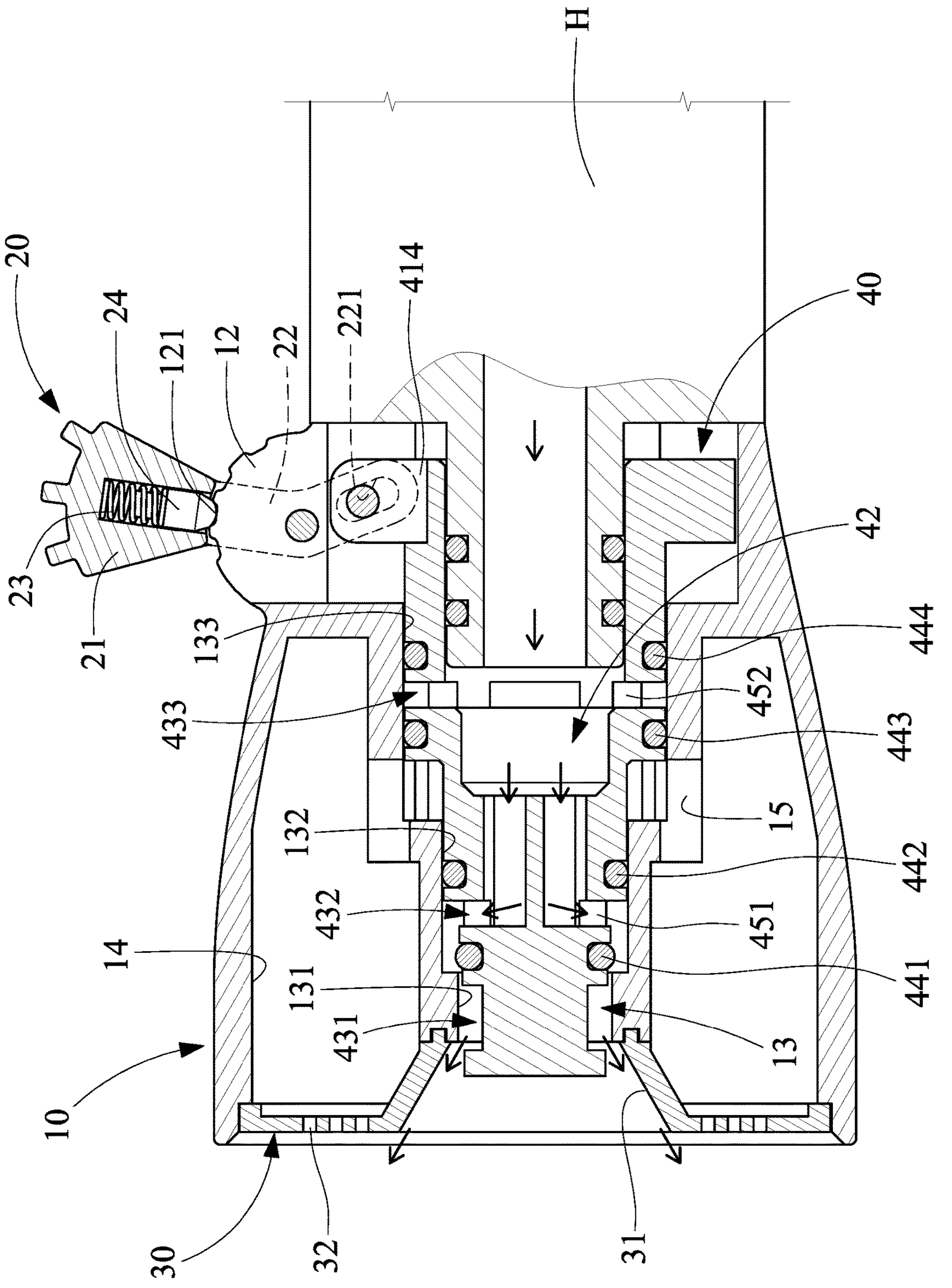
FIG. 8 is a cross-sectional view of the nozzle in another position than shown in FIG. 7.

Referring to FIG. 8, the nozzle is used to provide conical splash. To this end, the switch 20 is pivoted forward until each of the detents 24 is inserted in a third one of the recesses 121 of one of the lugs 12. Thus, the switch 20 moves the valve 40 further backward along the axial channel 13 to bias the annular groove 433 of the valve 40 from the lateral channels 15 and bring the ring 441 away from the wall of the axial channel 13. Hence, the annular groove 432 is in communication with the conical aperture 31 of the splashing plate 30 through the section 131 of the axial channel 13.

The rings 443 and 444, which are always in contact with the wall of the section 133 of the axial channel 13, close the annular groove 433. The ring 442, which are always in contact with the wall of the section 132 of the axial channel 13, closes the annular groove 432 on a side but allows the annular groove 432 to communicate with the conical aperture 31 of the splashing plate 30 through the sections 132 and 131 of the axial channel 13.

Thus, water goes from the hose H into the inlet 42, the first group of outlets 451 and the sections 132 and 131 of the axial channel 13. Finally, the water goes out of the conical aperture 31 of the splashing plate 30 as conical splash.

Figure 9:
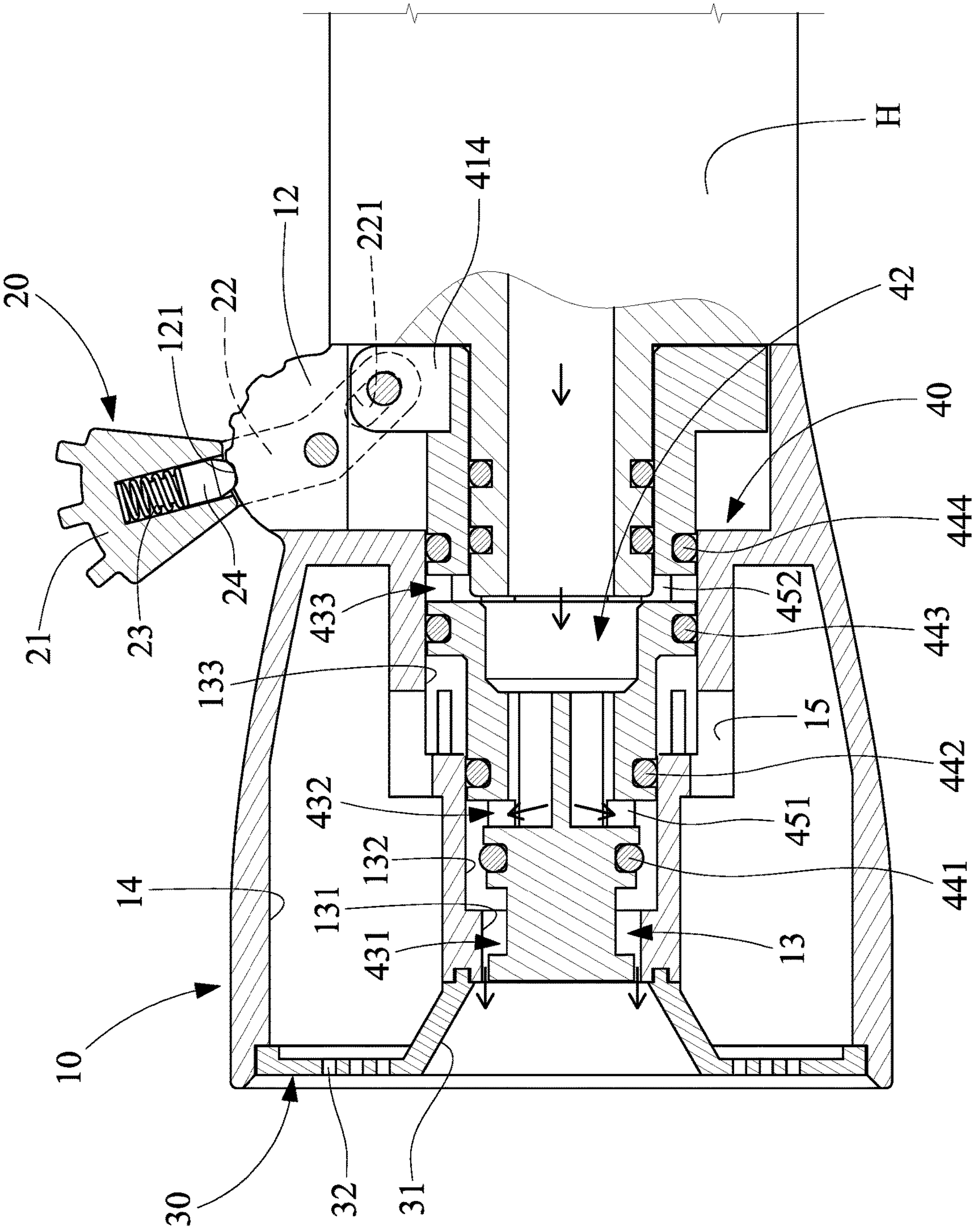
FIG. 9 is a cross-sectional view of the nozzle in another position than shown in FIG. 8.

Referring to FIG. 9, the nozzle is used to provide a water jet. To this end, the switch 20 is pivoted forward until each of the detents 24 is inserted in a fourth one of the recesses 121 of one of the lugs 12. Thus, the switch 20 moves the valve 40 further backward along the axial channel 13 to bias the annular groove 433 of the valve 40 from the lateral channels 15 and bring the ring 441 from the wall of the axial channel 13. The small section 411 of the valve 40 is completely inserted in the axial channel 13. The annular groove 432 is in communication with the annular groove 431 through the axial channel 13. The annular groove 431 is in communication with the conical aperture 31 through a gap between the small section 411 of the valve and the wall of the axial channel 13.

The rings 443 and 444, which are always in contact with the wall of the axial channel 13, close the annular groove 433. The ring 442, which is always in contact with the wall of the axial channel 13, closes the annular groove 432 on a side but allows the annular groove 432 to communicate with the conical aperture 31 of the splashing plate 30 through the gap.

Thus, water goes from the hose H into the inlet 42, the first group of outlets 451, the annular groove 432, the axial channel 13 and the annular groove 431 and the gap. Finally, the water goes out of the conical aperture 31 in a water jet.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A nozzle comprising:

a shell (10) comprising:

an axial channel (13) axially extending throughout the shell (10);

an internal face extending around the axial channel (13);

an annular chamber (14) extending around the axial channel (13);

lateral channels (15) for communicating the annular chamber (14) with the axial channel (13);

a splashing plate (30) connected to the shell (10) and formed with a conical aperture (31) in communication with the axial channel (13) and splashing apertures (32) in communication with the annular chamber (14);

a valve (40) being movable in the axial channel (13) and comprising:

a reduced section (411) formed at a first end;

an inlet (42) extending in a second end and operable for receiving a hose (H);

a first annular groove (431) extending around the reduced section (411);

a second annular groove (432);

a third annular groove (433) selectively in communication with the lateral channels (15);

a first ring (441) extending around the reduced section (411), wherein the first ring (441) is selectively in contact with the internal face of the shell (10);

a second ring (442) extending around the valve (40), wherein the second ring (442) is always in contact with the internal face of the shell (10);

a third ring (443) extending around the valve (40) on a side of the third annular groove (433), wherein the third ring (443) is always in contact with the internal face of the shell (10);

a fourth ring (444) extending around the valve (40) on another side of the third annular groove (433), wherein the fourth ring (444) is always in contact with the internal face of the shell (10);

a first group of outlets (451) for communicating the second annular groove (432) with the inlet (42);

a second group of outlets (452) for communicating the third annular groove (433) with the inlet (42);

a switch (20) comprising a portion pivotally connected to the shell (10) and another portion pivotally connected to the valve (40), wherein the switch (20) is operable to move the valve (40) along the axial channel (13);

wherein the axial channel (13) is in communication with the lateral channels (15) via the second annular groove (432) when the valve (40) is in a first position, thereby allowing water to be sprinkled from the splashing apertures (32);

wherein the first, second, third and fourth rings (441, 442, 443, 444) are all in contact with the internal face of the shell (10) when the valve (40) is in a second position, thereby closing the nozzle; and wherein the second annular groove (432), the axial channel (13) and the conical aperture (31) are in communication with one another and the first ring (441) is not in contact with the internal face of the shell (10) when the valve (40) in a third position, thereby allowing water to go out of the conical aperture (31).

2. The nozzle according to claim 1, wherein the switch (20) comprises a lever (22) pivotally connected to the shell (10) and the valve (40) and a handle (21) formed at an end of the lever (22) out of the shell (10).

3. The nozzle according to claim 2, wherein the shell (10) comprises two lugs (12), wherein the valve (40) comprises two ears (414), wherein the lever (22) is pivotally connected to the lugs of the shell (10) and the ears (414) of the valve (40).

4. The nozzle according to claim 3, wherein each of the lugs (12) is formed with recesses (121), wherein the switch (20) comprises two bores (211) in the handle (21) on two sides of the lever (22), two springs (23) inserted in the bores (211), and two detents (24) each of which comprises an end abutted against one of the springs (23) and another end inserted in one of the bores (211) of one of the lugs (12).

5. The nozzle according to claim 2, further comprising a pin (451) inserted in the ears (414) of the valve (40), wherein the lever (22) comprises a slot (221) along which the pin (451) is movable.

6. The nozzle according to claim 1, wherein the reduced section (411) of the valve (40) is partially located out of the axial channel (13) to allow the second annular groove (432) to be in communication with the conical aperture (31) when the valve (40) is in the third position, thereby providing conical splash from the conical aperture (31).

7. The nozzle according to claim 1, wherein the reduced section (411) of the valve (40) is completely inserted in the axial channel (13) to allow water to travel through a gap between the reduced section (411) of the valve (40) and the internal face of the shell (10), thereby providing a water jet from the conical aperture (31).

8. The nozzle according to claim 1, wherein the splashing plate (30) comprises a conical portion extending around the conical aperture (31), wherein the conical portion of the splashing plate (30) isolates the axial channel (13) from the annular chamber (14).

* * * * *